United States Patent [19]

Higuchi

[11] Patent Number: 5,446,832
[45] Date of Patent: Aug. 29, 1995

[54] PRINTING METHOD AND APPARATUS

[75] Inventor: Yuichi Higuchi, Yokohama, Japan

[73] Assignee: Canon Kabushiki Kaisha, Tokyo, Japan

[21] Appl. No.: 371,578

[22] Filed: Jan. 12, 1995

Related U.S. Application Data

[63] Continuation of Ser. No. 074,152, Jun. 9, 1993, abandoned, which is a continuation of Ser. No. 708,248, May 31, 1991, abandoned.

[30] Foreign Application Priority Data

Jun. 1, 1990 [JP] Japan ................................. 2-141603

[51] Int. Cl.6 ................................................ G06F 15/00
[52] U.S. Cl. ........................................ 395/113; 395/115
[58] Field of Search ................... 395/101, 113–115, 395/164; 358/405, 413, 437, 298; 400/50, 51, 52, 74

[56] References Cited

U.S. PATENT DOCUMENTS

| | | | |
|---|---|---|---|
| 4,673,990 | 6/1987 | Okada | 345/113 |
| 4,860,119 | 8/1984 | Maniwa et al. | 358/296 |
| 4,953,103 | 8/1990 | Suzuki | 385/115 |

FOREIGN PATENT DOCUMENTS

0297567 4/1989 European Pat. Off. .............. 395/15

*Primary Examiner*—Arthur G. Evans
*Attorney, Agent, or Firm*—Fitzpatrick, Cella, Harper & Scinto

[57] ABSTRACT

A printing method and apparatus for receiving print data from an external apparatus, for developing the received data into image data, and for outputting and printing onto a recording medium are disclosed. The apparatus comprises a printer to print the print data onto a recording medium; an instructing circuit to instruct inhibition of the printing; and a controller to control so as to inhibit the printing process by the printer when printing inhibition has been instructed by the instructing circuit. With the apparatus, an unnecessary printing operation and wasteful consumption of recording papers and various articles of consumption at the time of a test of the printing, a repair, or the like can be prevented.

14 Claims, 2 Drawing Sheets

PRINTING METHOD AND APPARATUS

This application is a continuation of application Ser. No. 08/074,152 filed Jun. 9, 1993, now abandoned, which is a continuation of application Ser. No. 07/708,248 filed May 31, 1991, now abandoned.

BACKGROUND OF THE INVENTION

1. Field of the Invention

The present invention relates to printing method and apparatus for receiving data to be generated and for developing the received data into image data and for printing and outputting the image data.

2. Related Background Art

In recent years, with the remarkable development of information processing techniques, various types of printing apparatuses which convert data into a visible image and record have been proposed. As a general printer among those printing apparatuses, there is a printer which has a pattern memory which develops pattern data in the pattern memory into an image memory on the basis of print data including a character code or the like which is sent from a higher-order apparatus, and which prints the pattern data.

In the above conventional printer, however, the print data which has once been stored in the printer is automatically printed at a time point when a new-page instruction, an image memory full state, or a data end has been generated. That is, the conventional printer doesn't have means for inhibiting the printing operation of the print data which is sent from the higher order apparatus. Therefore, the printing operation is executed, for instance, even in the case of a trouble shooting such as to check an interface between the higher-order apparatus and the printer or in the case where a practical printing operation such as an emulation of the printing operation in the higher-order apparatus or the like is unnecessary.

Consequently, there are inconveniences such that papers or various articles of consumption are used in vain and that if a paper conveyance jam has occurred upon execution of the printing operation, it takes surplus time to recover the jam, so that the working time is obstructed, and the like.

SUMMARY OF THE INVENTION

It is an object of the invention to provide a printing method and apparatus which has printing means for printing onto a recording medium on the basis of print data and in which when it is detected that the inhibition of the printing has been instructed, a printing process to print onto the recording medium on the basis of the print data can be inhibited, thereby making it possible to prevent an unnecessary printing operation at the time of, for instance, a test of the printing, a repair, or the like.

DETAILED DESCRIPTION OF THE PREFERRED EMBODIMENT

A preferred embodiment of the invention will be described in detail hereinbelow with reference to the drawings.

Figure 1:
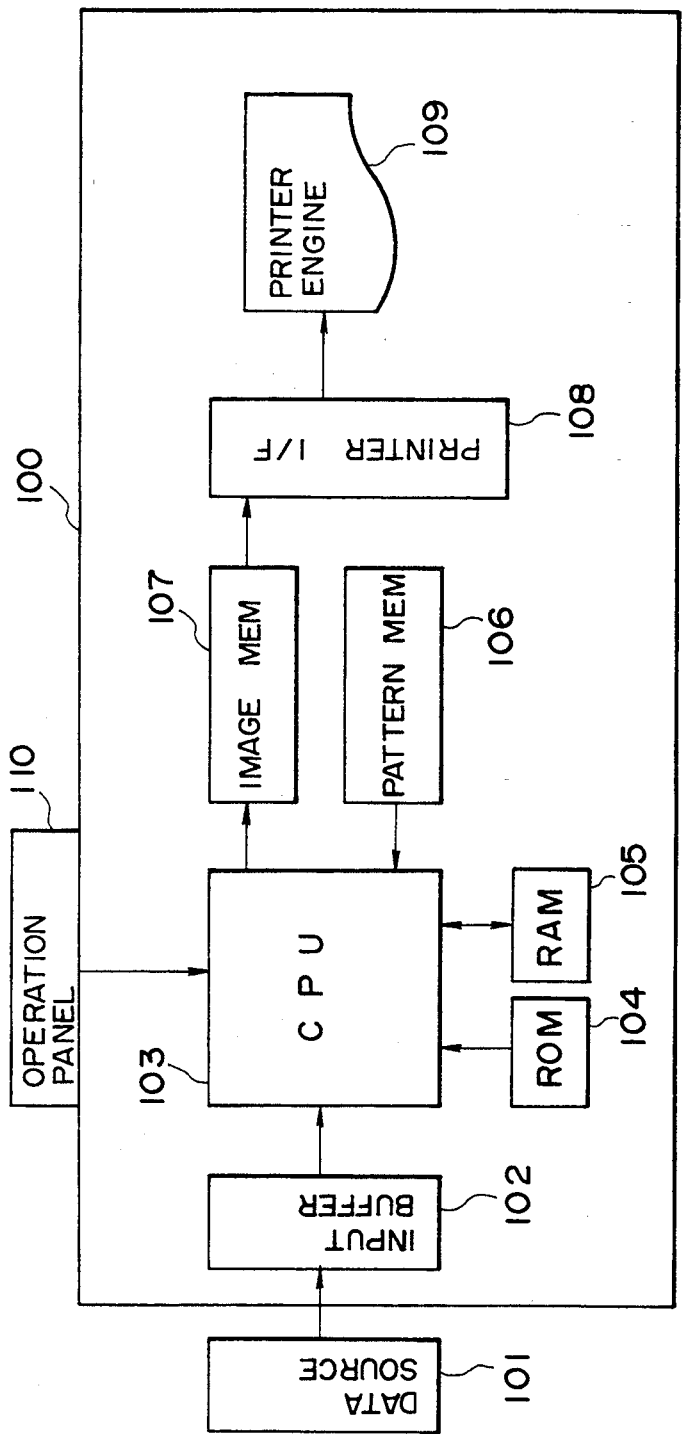
FIG. 1 is a block diagram showing a schematic construction of a printer in an embodiment.

Description of a printer (FIG. 1)

FIG. 1 is a block constructional diagram showing a schematic construction of a printer 100 according to an embodiment of the invention.

Figure 3:
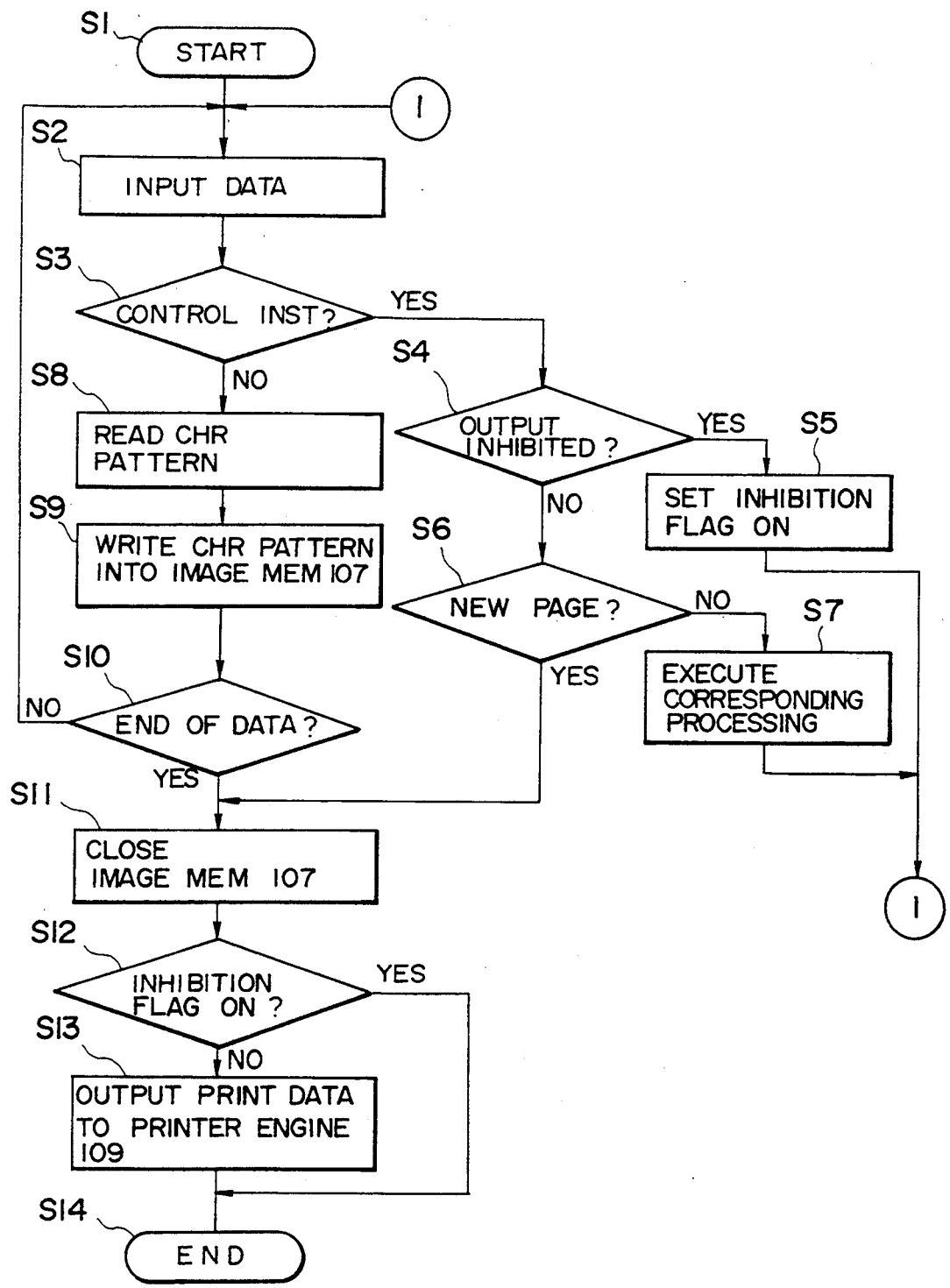
FIG. 3 is a flowchart showing a processing procedure by a CPU 103 of a printer in the embodiment.

Reference numeral 101 denotes a data source as a higher-order apparatus such as a host computer or the like. Print data such as character codes, figure data, or the like is generated in the data source 101 and output to the printer 100. Reference numeral 102 denotes an input buffer to temporarily store the data from the data source 101; 103 a CPU for executing an arithmetic operation and an analysis of the input data and for controlling the whole printer 100; 104 a ROM in which a control program of the CPU 103 as shown in FIG. 3 and various data have been stored; and 105 a RAM which is used as a work area of the CPU 103 and can temporarily store various data.

Reference numeral 106 denotes a pattern memory in which image patterns corresponding to the character codes included in the print data have been stored; 107 an image memory in which a print image of one page which has been pattern developed with reference to the pattern memory 106 has been stored; 108 a printer interface (I/F) for transferring print data to a printer engine 109 and for controlling the data transfer; and 109 the printer engine to actually record an image onto a recording medium by, for example, an electro-photographic method, a thermal copy transfer method, an ink jet method, or the like.

Figure 2:
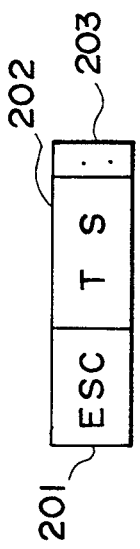
FIG. 2 is a diagram showing an example of an output inhibition instruction in the embodiment.

FIG. 2 is a diagram showing an example of a control instruction which is supplied from the data source 101 to the printer 100 and is used to inhibit the printing operation.

Reference numeral 201 denotes an ESC code indicating that subsequent data after the ESC code denotes a control instruction; 202 an ID code indicating that the present instruction is a command to execute a control regarding whether the print output is performed or not; and 203 a delimiter indicative of the end of the control instruction.

FIG. 3 is a flowchart showing a flow of the control by the CPU 103 of the printer 100 according to the embodiment. The outline of the operation in the embodiment will now be described hereinbelow with reference to FIGS. 1 to 3. The control program to execute the above control has been stored in the ROM 104.

The processing routine is started when data is generated from the data source 101. The data which has been supplied in step S2 is stored into the input buffer 102. In step S3, a check is made to see if the input data indicates a control instruction or not by discriminating whether the input data includes the ESC code 201 or not. If YES, a check is made in step S4 to see if the control instruction is an output inhibition instruction or not. If YES, step S5 follows and an output inhibition flag of the RAM 105 is set to ON. If NO in step S4, step S6 follows and a check is made to see if the control instruction is a new page instruction or not. If NO, step S7 follows and the analysis and a predetermined operation procedure corresponding to the control instruction are executed. Then, the processing routine is returned to step S2.

If it is determined in step S3 that the input data doesn't indicate the control instruction, step S8 follows and the character pattern corresponding to the character code of the input data is read out of the pattern memory 106. The read character pattern is written into the image memory 107 in step S9. In step S10, a check is made to see if any other data further exists or not. If YES, the processing routine is returned to step S2.

If there is no data which is supplied from the data source 101, the image memory 107 is closed in step S11. That is, it is determined that all of the print data has been completed, the printing operation is now started. The above process is also similarly executed in the case where it is decided in step S6 that the control instruction is the new page instruction.

In the embodiment, however, the foregoing discrimination regarding the presence or absence of the output inhibition instruction is performed prior to the actual printing operation. That is, in step S12, a check is made to see if the output inhibition flag in the RAM 105 has been set to ON or not. If YES, the print data is not supplied from the image memory 107 to the printer engine 109 but the processing routine is finished. On the contrary, if it is determined that the output inhibition flag has been set to OFF in step S12, step S13 follows and the print data is transferred to the printer engine 109 through the printer interface 108 and the ordinary printing operation is executed.

That is, in the printer of the embodiment, the output inhibition instruction shown in FIG. 2 is discriminated and the printing operation can be inhibited.

In the embodiment, the discrimination about the ON/OFF of the output inhibition flag has been performed in step S12. That is, the output inhibition is discriminated after completion for the development of all of the images. However, such a discrimination can be also performed at a time point when the output inhibition instruction has been detected in step S4. It will be obviously understood that a format of the output inhibition instruction in FIG. 2 is not limited to the above format.

Although an example in which the print output is inhibited in accordance with an instruction from the data source 101 such as a host computer or the like has been described above, for instance, the print output can be also inhibited by an instruction input from an operation panel 110 in FIG. 1. In this case, in place of checking the ON/OFF state of the output inhibition flag as described above in step S12 in the flowchart of FIG. 3, it is also possible to construct in a manner such that a check is made to see if an output inhibition switch of the operation panel 110 has been turned on or not and, if it is ON, step S13 is not executed but the processing routine advances to step S14 and is finished.

As described above, according to the embodiment, by providing means for enabling the output to be inhibited from a higher-order apparatus, it is possible to prevent, for instance, the papers and various articles of consumption upon testing from being wasted.

On the other hand, by making the processing steps until the image development coincide with the ordinary printing operations, various advantages such that it is possible to clearly discriminate whether the operation of the printer engine is normal or not and the like are obtained.

I claim:

1. A printer apparatus for generating information based on information input from an information processing apparatus and for printing the generated information, said printer apparatus comprising:

determining means for determining whether transfer inhibition information for inhibiting memory means, which stores the generated information, from transferring the generated information to a printer engine is input from externally of said printer apparatus prior to an actual printing operation; and control means for controlling the memory means to continuously store the generated information based on the information input from the information processing apparatus and inhibiting the memory means from transferring the stored, generated information to the printer engine when said determining means determines that the transfer inhibition information is input.

2. An output apparatus according to claim 1, wherein the input information comprises a character code.

3. An output apparatus according to claim 2, wherein the generated information comprises image data formed based on the character code.

4. An output apparatus according to claim 1, wherein the transfer inhibition information is input from the information processing apparatus to said output apparatus.

5. An output apparatus according to claim 1, wherein the transfer inhibition information is input by instruction means communicating with said output apparatus.

6. An output apparatus according to claim 1, wherein said determining means determines whenever the transfer inhibition information is input whether the memory means stores one page of the generated information.

7. An output apparatus according to claim 1, further comprising a printer engine, wherein said control means controls the memory means to transfer the stored information to said printer engine.

8. A printing method for use with a printer apparatus for generating information based on information input from an information processing apparatus and for printing the generated information, said printer method comprising the steps of:

determining whether transfer inhibition information for inhibiting memory means of the printer apparatus, which stores the generated information, from transferring the generated information to a printer engine is input from externally of the printer apparatus prior to an actual printing operation; and controlling the memory means to continuously store the generated information based on the information input from the information processing apparatus and inhibiting the memory means from transferring the stored, generated information to the printer engine when in said determining step it is determined that the transfer inhibition information is input.

9. An output method according to claim 8, wherein the input information comprises a character code.

10. An output method according to claim 9, wherein the generated information comprises image data formed based on the character code.

11. An output method according to claim 8, wherein the transfer inhibition information is input from the information processing apparatus to the output apparatus.

12. An output method according to claim 8, wherein the transfer inhibition information is input by instruction means communicating with the output apparatus.

13. An output method according to claim 8, wherein in said determining step it is determined whether the transfer inhibition information is input whenever the memory means stores one page of the generated information.

14. An output method according to claim 8, wherein said control step controls the memory means to transfer the stored information to a printer engine provided in the output apparatus.

* * * * *

UNITED STATES PATENT AND TRADEMARK OFFICE
CERTIFICATE OF CORRECTION

PATENT NO. :     5,446,832
DATED       :    August 29, 1995
INVENTOR(S) :    YUICHI HIGUCHI It is certified that error appears in the above-indentified patent and that said Letters Patent is hereby corrected as shown below:

ON THE COVER PAGE

Item: [56] References Cited

U.S. PATENT DOCUMENTS

Insert --4,979,132   12/1990 Sugimoto--;
and "4,860,119   8/1984 Maniwa et al."
should read
    --4,860,119   8/1989 Maniwa et al. --.

Signed and Sealed this

Twenty-sixth Day of December, 1995

Attest:

BRUCE LEHMAN

Attesting Officer    Commissioner of Patents and Trademarks